US012571486B2

(12) United States Patent
Wang et al.

(10) Patent No.: US 12,571,486 B2
(45) Date of Patent: Mar. 10, 2026

(54) CONTROL VALVE AND MANUFACTURING METHOD THEREFOR

(71) Applicant: ZHEJIANG SANHUA AUTOMOTIVE COMPONENTS CO., LTD., Zhejiang (CN)

(72) Inventors: Lixin Wang, Zhejiang (CN); Long Lin, Zhejiang (CN); Yun Wang, Zhejiang (CN)

(73) Assignee: ZHEJIANG SANHUA AUTOMOTIVE COMPONENTS CO., LTD., Zhejiang (CN)

( * ) Notice: Subject to any disclaimer, the term of this patent is extended or adjusted under 35 U.S.C. 154(b) by 0 days.

(21) Appl. No.: 18/555,549

(22) PCT Filed: Apr. 15, 2022

(86) PCT No.: PCT/CN2022/087033
§ 371 (c)(1),
(2) Date: Oct. 16, 2023

(87) PCT Pub. No.: WO2022/218405
PCT Pub. Date: Oct. 20, 2022

(65) Prior Publication Data
US 2024/0200685 A1      Jun. 20, 2024

(30) Foreign Application Priority Data
Apr. 16, 2021    (CN) .......................... 202110411384.6

(51) Int. Cl.
F16K 11/07 (2006.01)
F16K 11/076 (2006.01)
(Continued)

(52) U.S. Cl.
CPC .......... F16K 31/535 (2013.01); F16K 11/076 (2013.01); F16K 27/041 (2013.01);
(Continued)

(58) Field of Classification Search
CPC .... F16K 41/046; F16K 31/045; F16K 27/041; F16K 31/535
See application file for complete search history.

(56) References Cited

U.S. PATENT DOCUMENTS

| | | | |
|---|---|---|---|
| 5,816,290 A | 10/1998 | Altshuler | |
| 2015/0027572 A1 | 1/2015 | Morein | |

(Continued)

FOREIGN PATENT DOCUMENTS

| | | |
|---|---|---|
| CN | 201246487 Y | 5/2009 |
| CN | 104896147 A | 9/2015 |

(Continued)

OTHER PUBLICATIONS

EP2295757A1 Machine Translation (Year: 2011).*
(Continued)

*Primary Examiner* — Michael R Reid
(74) *Attorney, Agent, or Firm* — Apex Attorneys at Law, LLP; Yue (Robert) Xu

(57) ABSTRACT

A control valve includes a valve body and a valve core. The valve core includes a top plate, a bottom plate, a first stop block and a valve core shaft assembly. The valve core shaft assembly includes a transmission connection part. At least part of the transmission connection part is position on the side of the top plate away from the bottom plate. The first stop block is fixedly connected to the top plate to form an integrated structure. The first stop block extends from the top plate in a direction away from the bottom plate. The valve body further includes a top wall part and a second stop block that are positioned at one end in the height direction of the side wall part. The top wall part and the side wall part are integrally formed. The top wall part is provided with a through hole.

17 Claims, 9 Drawing Sheets

(51) Int. Cl.

| | |
|---|---|
| *F16K 27/04* | (2006.01) |
| *F16K 31/04* | (2006.01) |
| *F16K 31/53* | (2006.01) |
| *F16K 41/04* | (2006.01) |
| *F16K 27/12* | (2006.01) |

(52) U.S. Cl.

CPC .......... *F16K 31/045* (2013.01); *F16K 41/046* (2013.01); *F16K 27/12* (2013.01); *F16K 2200/20* (2021.08)

(56) References Cited

U.S. PATENT DOCUMENTS

| | | | |
|---|---|---|---|
| 2017/0009894 A1 | 1/2017 | Seko et al. | |
| 2020/0049265 A1 | 2/2020 | Zhu | |
| 2021/0088149 A1 | 3/2021 | Nomura | |
| 2023/0258271 A1* | 8/2023 | Wang ................... | F16K 31/043 |
| | | | 137/625.47 |
| 2024/0035580 A1* | 2/2024 | Wang ................. | F16K 11/0856 |

FOREIGN PATENT DOCUMENTS

| | | | |
|---|---|---|---|
| CN | 205244483 U | 5/2016 |
| CN | 107202173 A | 9/2017 |
| CN | 109237054 A | 1/2019 |
| CN | 109424766 A | 3/2019 |
| EP | 2295757 A1 | 3/2011 |
| JP | 2001082628 A | 3/2001 |
| JP | 2006009830 A | 1/2006 |
| JP | 2008215626 A | 9/2008 |
| JP | 2013221593 A | 10/2013 |
| JP | 2018096543 A | 6/2018 |
| JP | 2019132286 A | 8/2019 |
| JP | 2019211075 A | 12/2019 |
| JP | 2020073832 A | 5/2020 |
| JP | 2020197305 A | 12/2020 |
| WO | 9522023 A1 | 8/1995 |
| WO | 2018061892 A1 | 4/2018 |

OTHER PUBLICATIONS

The Japanese 1st Office Action issued on Aug. 27, 2024 for JP2023-563235.

International Search Report for PCT/CN2022/087033 mailed Jul. 18, 2022, ISA/CN.

The Japanese 2nd Office Action issued on Feb. 25, 2025 for JP2023-563235.

The Partial European Search Report issued on Mar. 5, 2025 for EP22787627.3.

The Japanese 1st Office Action issued on Aug. 19, 2025 for JP2023-563235.

* cited by examiner height direction

Q3

22

CONTROL VALVE AND MANUFACTURING METHOD THEREFOR

The present application is a National Phase entry of PCT Application No. PCT/CN2022/087033, filed on Apr. 15, 2022, which claims priority to Chinese Patent Application No. 202110411384.6, titled "CONTROL VALVE AND MANUFACTURING METHOD THEREOF ", filed on Apr. 16, 2021 with the China National Intellectual Property Administration, which are incorporated herein by reference in their entireties.

FIELD

The present application relates to the technical field of fluid control, and in particular to a control valve and a manufacturing method of the control valve.

BACKGROUND

Generally, a valve core of a control valve is driven to rotate by a driving member, so as to realize fluid control for multiple flow paths via the control valve. How to make a rotation position of the valve core relatively accurate and reduce the deformation of the valve core is an urgent problem to be solved.

SUMMARY

The purpose of the present application is to provide a control valve that makes the position of the valve core relatively accurate and reduces the deformation of the valve core.

In one aspect, a control valve is provided according to the embodiments of the present application. The control valve includes a valve body, and a valve core. The valve body includes a side wall part, the control valve has a valve cavity, and the side wall part forms at least part of a wall of the valve cavity, at least part of the valve core is located in the valve cavity and is configured to be driven to rotate, the valve core includes a top plate, a bottom plate, a first block, and a valve-core shaft assembly, the top plate and the bottom plate are arranged along a height direction of the valve core, the valve-core shaft assembly includes a transmission connection part, at least part of the transmission connection part is located on a side of the top plate facing away from the bottom plate, the valve core is configured to be driven to rotate through the transmission connection part, and the first block is connected to the top plate; and the valve body further includes a top wall part and a second block, the top wall part is arranged close to an end of the side wall part, the top wall part has a through hole, the through hole communicates with the valve cavity, at least part of the transmission connection part goes through the through hole to be located outside the valve body, the second block is located in the valve cavity and protrudes from the top wall part, and if the valve core rotates to a predetermined position, the first block abuts against the second block and restricts the valve core from continuing to rotate towards the second block.

In another aspect, a method for manufacturing a control valve is provided according to the embodiments of the present application. The method includes:

providing a valve core, a valve body, a sealing ring, and a bottom cover, where the valve core includes a valve-core shaft assembly, the valve-core shaft assembly includes a first valve-core shaft and a second valve-core shaft, the first valve-core shaft includes a first connection part, and the second valve-core shaft includes a second connection part, a step part, and a transmission connection part, the transmission connection part and the second connection part are arranged along a height direction of the second valve-core shaft, the step part is located on an outer peripheral side of the second connection part, the step part has a step surface, the valve body includes a side wall part and a top wall part, the top wall part is integrally formed with the side wall part, the control valve has a valve cavity, the top wall part is located at one end of the side wall part, the other end of the side wall part has an opening communicating with the valve cavity, the top wall part has a through hole that penetrates through the top wall part, and the through hole communicates with the valve cavity;

forming a valve core assembly, including assembling the first valve-core shaft, the second valve-core shaft, and the sealing ring, so as to allow the first connection part to be in transmission connection with the second connection part, where the sealing ring is mounted on an outer peripheral side of the second valve-core shaft and contacts the step surface or there is a gap between the sealing ring and the step surface;

mounting the valve core into the valve cavity from the opening, and making at least part of the transmission connection part go through the through hole to be located outside the valve body; and fixedly connecting the bottom cover to an end, away from the top wall part, of the side wall part, and arranging the bottom cover and the end, away from the top wall part, of the side wall part in a sealed manner.

According to the control valve and the method for manufacturing the control valve provided by the embodiments of the present application, by providing the first block in the valve core and providing the second block in the valve body, if the valve core rotates to the predetermined position, the first block abuts against the second block and restricts the valve core from continuing to move towards the second block, so that a position reference is formed between the valve core and the valve body, making the rotation position of the valve core more accurate, so as to improve the control accuracy of the control valve. The valve core includes the transmission connection part, and the transmission connection part can be in transmission connection with a driving device to drive the valve core to rotate. The first block is fixedly connected to the top plate close to the transmission connection part, and the second block is fixedly connected to the top wall part close to the transmission connection part, so that when the first block abuts against the second block, the first block is close to the transmission connection part and the driving device, and a driving force arm received is small, which can reduce the torsion deformation degree of the valve core and improve the operation stability of the control valve.

DETAILED DESCRIPTION OF EMBODIMENTS

Features and exemplary embodiments of various aspects of the present application are described in detail below. In order to make the purposes, technical solutions and advantages of the present application clearer, the present application is further described in detail below in conjunction with the drawings and specific embodiments. In this specification, relational terms such as "first" and "second" are only used to distinguish one element from another element with a same name, and do not necessarily require or imply any actual relationship or order between the elements.

Figure 1:
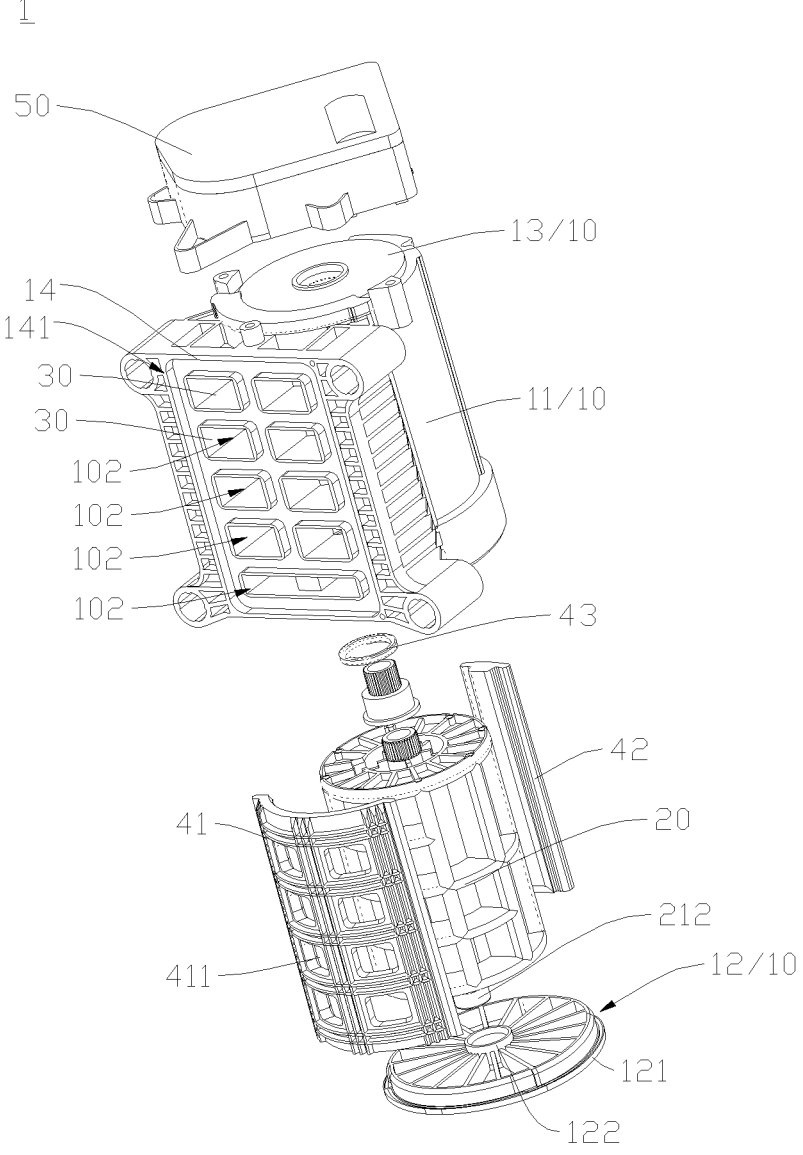
FIG. 1 is a schematic diagram of an explosive structure of a control valve provided according to an embodiment of the present application.
Figure 2:
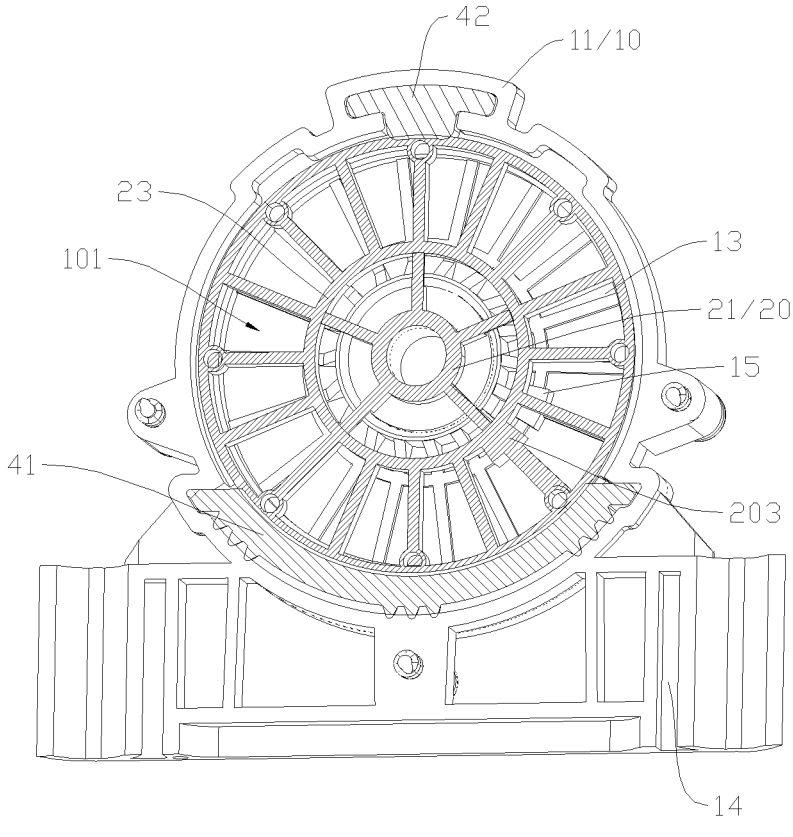
FIG. 2 is a cross-sectional schematic diagram of the control valve shown in FIG. 1 at a position.
Figure 3:
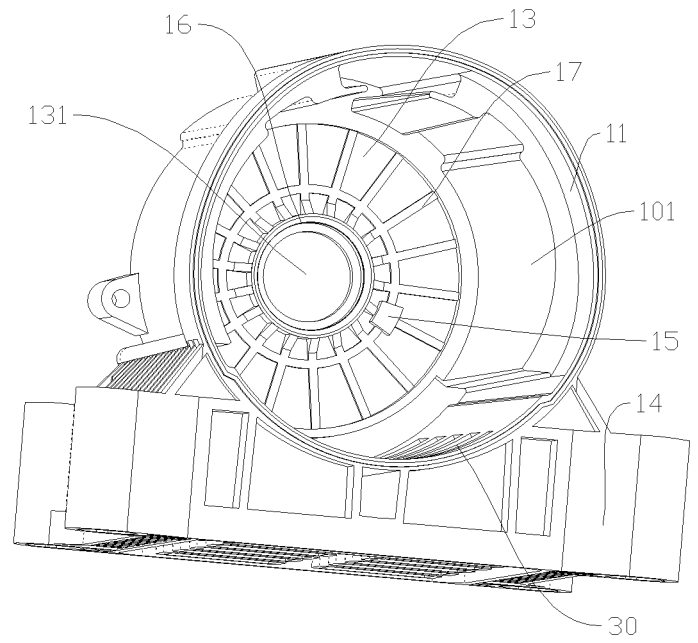
FIG. 3 is a partial structural schematic diagram of a valve body provided according to an embodiment of the present application.

As shown in FIGS. 1 to 3, a control valve 1 is provided according to an embodiment of the present application. The control valve 1 includes a valve body 10, a valve core 20, and a first sealing member 41. The valve body 10 includes a side wall part 11, and the control valve 1 has a valve cavity 101. The side wall part 11 forms a peripheral wall of the valve cavity 101 or at least part of the peripheral wall. The first sealing member 41 is arranged between the valve core 20 and the side wall part 11 along a radial direction of the valve core 20, and the valve core 20 can be driven to rotate. The control valve 1 may further include a driving device 50 and a sealing ring 43. The driving device 50 includes a driving member, the driving member may be a motor or a combination of a motor and a reduction gear set, and the valve core 20 can be driven to rotate by the driving member in the driving device 50. In FIG. 1, the valve body 10 further includes a bottom cover 12 and a top wall part 13. The bottom cover 12 and the valve cavity 101 are located between the top wall part 13 and the side wall part 11, and the top wall part 13 and the side wall part 11 are integrally formed. The sealing ring 43 is arranged between the top wall part 13 and the valve core 20, and at least part of the side wall part 11 is arranged between the bottom cover 12 and the top wall part 13. The bottom cover 12 and the side wall part

11 may be fixedly connected and arranged in a sealed manner through a welding process to prevent fluid leakage. As at least part of the valve core 20 penetrates through the top wall part 13 to be located outside the valve body 10 for transmission connection with the driving device 50, by providing the sealing ring 43 located between the top wall part 13 and the valve core 20, fluid leakage from the top wall part 13 can be prevented, which improves the sealing performance of the control valve 1. The control valve 1 may include at least five channels 30, one end of each of the at least five channels 30 penetrates the side wall part 11 and communicates with the valve cavity 101, and the other end of each of the at least five channels 30 forms a valve port 102 of the control valve 1, and fluid can enter or leave the control valve 1 from the valve port 102.

In order to facilitate the assembly of the control valve 1 and other components in a fluid control system and improve the integration degree of the control valve 1 and other components, in some embodiments, as shown in FIGS. 1 to 3, the valve body 10 further includes an mounting part 14, the mounting part 14 is fixedly connected to the side wall part 11 and located on a side, facing away from the valve cavity 101, of the side wall part 11. For example, the mounting part 14 and the side wall part 11 may be integrally formed, the mounting part 14 has a mounting surface 141, and the valve port 102 of the control valve 1 penetrates through the mounting surface 141, so that all the valve ports 102 of the control valve 1 are formed on the mounting surface 141 and the orientations of the valve ports 102 are same, which can relatively simplify assembly steps of the control valve 1 and other components, reduce leakage points of connecting portions, and improve the reliability of sealing. In some embodiments, the first sealing member 41 includes through holes 411 that penetrate through the first sealing member 41, the through holes 411 correspond to and communicate with at least part of the channels 30 of the control valve 1. The first sealing member 41 is deformed by the pressure from the valve core 20 and the side wall part 11, thereby realizing the sealing of the control valve 1 by the first sealing member 41. It can be understood that the channels of the control valve 1 may also be arranged along a circumferential direction of the side wall part 11, and the valve ports 102 may also be arranged along the circumferential direction of the side wall part 11, which is not limited in the present application.

Further referring to FIGS. 1 and 2, a cross section of the first sealing member 41 is of an arc-shaped structure. When the valve core 20 presses the first sealing member 41, it is easy to cause eccentricity of the valve core 20, which easily affect the rotation of the valve core 20. Therefore, in some embodiments, the control valve 1 may further include a second sealing member 42, the second sealing member 42 and the first sealing member 41 are respectively arranged on both sides of the valve core 20 in the radial direction of the valve core 20, so that the second sealing member 42 and the first sealing member 41 apply forces to the valve core 20, thereby maintaining the coaxiality of the valve core 20 and the side wall part 11, and improving the rotation stability of the valve core 20.

Figure 4:
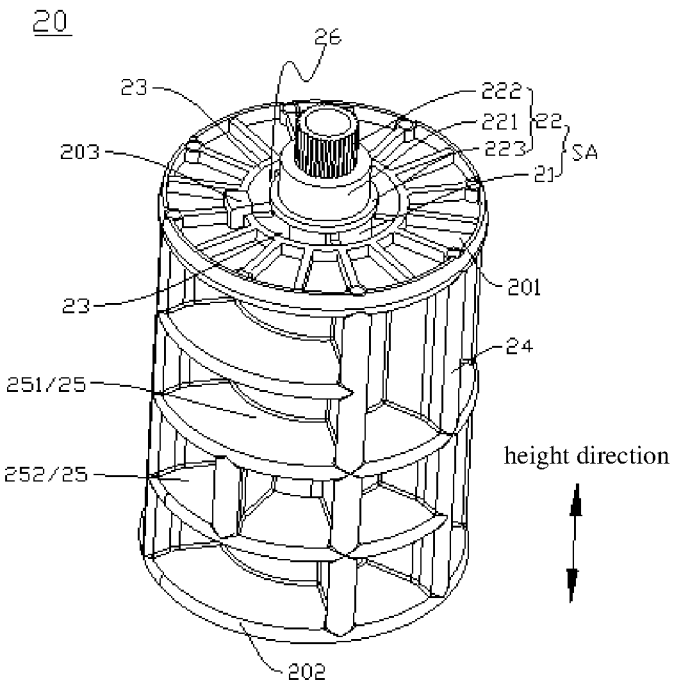
FIG. 4 is a structural schematic diagram of a valve core provided according to an embodiment of the present application.
Figure 5:
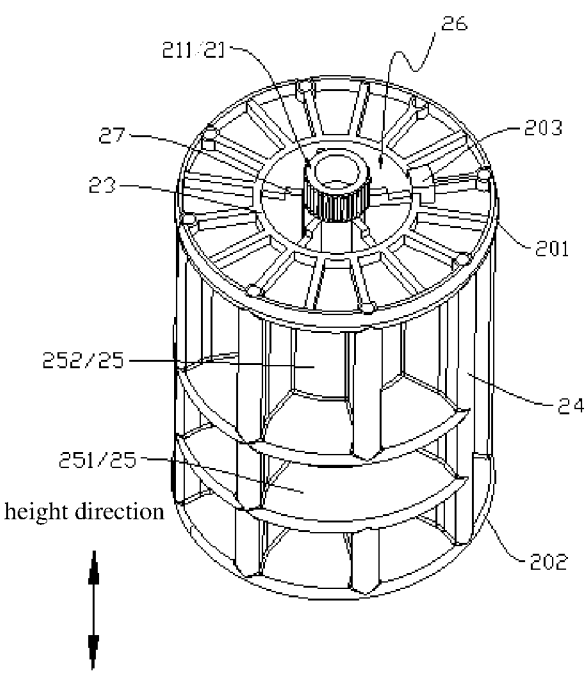
FIG. 5 is a partial structural schematic diagram of the valve core shown in FIG. 4.
Figure 6:
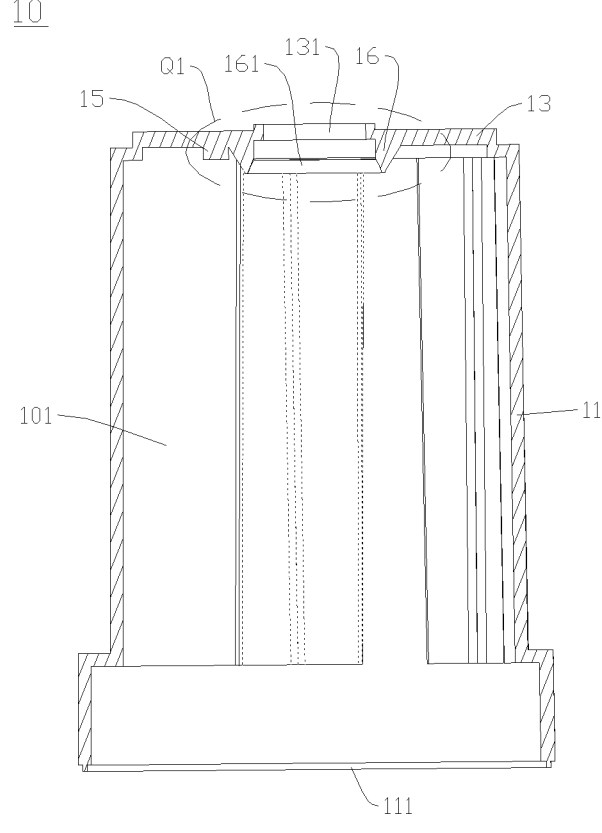
FIG. 6 is a schematic diagram of a partial cross-sectional structure of the valve body shown in FIG. 3.

As shown in FIGS. 1, 4, and 5, the valve core 20 has multiple outer communication cavities 25. Each outer communication cavity 25 is a groove structure formed by recessing a side surface of the valve core 20 toward an interior of the valve core 20. During the rotation of the valve core 20, corresponding two valve ports 102 can be opened and/or closed through at least part of the outer communication cavities 25. Further, the valve core 20 may further include an inner communication cavity 26, multiple outer communication cavities 25 are distributed on an outer peripheral side of the inner communication cavity 26. The inner communication cavity 26 communicates with part of the outer communication cavities 25, so that during the rotation of the valve core 20, the corresponding two valve ports 102 can be opened and/or closed through the outer communication cavities 25 and the inner communication cavity 26, so as to realize the control of the fluid by the control valve 1.

Further, the valve core 20 includes a top plate 201, a bottom plate 202, a first partition 23, a second partition 24, a first block 203, and a valve-core shaft assembly SA. The first partition 23 has a communication hole, and the inner communication cavity 26 communicates with part of the outer communication cavities 25 through the communication hole. Each of the outer communication cavities 25 is separated into an independent space by the second partition 24, and cross-sectional areas of cavity mouths of the outer communication cavities 25 may be different, for example, the outer communication cavities 25 may include a first cavity 251 and a second cavity 252. A cross-sectional area of a cavity mouth of the first cavity 251 is greater than or equal to twice a cross-sectional area of a cavity mouth of the second cavity 252. In this way, the first cavity 251 can open and/or close the two valve ports 102 corresponding to the first cavity 251, and the inner communication cavity 26 communicates with the part of the second cavities 252 through the communication hole, so that the inner communication cavity 26 and the part of the second cavities 252 can open and/or close the two valve ports 102 corresponding to the inner communication cavity 26 and the part of the second cavities 252.

The top plate 201 and the bottom plate 202 of the valve core 20 are arranged along a height direction of the valve core 20, and the outer communication cavities 25 are located between the top plate 201 and the bottom plate 202, and the top plate 201 and the bottom plate 202 are mounted outside an outer peripheral side of the valve-core shaft assembly SA. The valve-core shaft assembly SA includes a transmission connection part 222, and at least part of the transmission connection part 222 protrudes from the top plate 201 and is located on a side of the top plate 201 facing away from the bottom plate 202. Referring to FIG. 1, the valve core 20 is in transmission connection with the driving device 50 through the transmission connection part 222, so that the driving device 50 can drive the valve core 20 to rotate through the transmission connection part 222. The first block 203 protrudes from the top plate 201 and is fixedly connected to the top plate 201 as an integral structure, or the first block 203 and the top plate 201 may be separately provided and fixedly connected. In this way, the driving device 50 is arranged close to the top plate 201, the first block 203 extends from the top plate 201 toward a direction away from the bottom plate 202, and the first block 203 can limit a rotation position of the valve core 20. In the embodiment of the present application, since the first block 203 is fixedly connected to the top plate 201 close to the transmission connection part 222, the first block 203 is relatively close to the transmission connection part 222 and the driving device 50 when the first block 203 limits the rotation position of the valve core 20, a driving force arm applied to the first block 203 is relatively small, which can reduce the torsional deformation of the valve core 20 and improve the operational stability of the control valve 1. In another embodiment, the valve core 20 may further include a reinforcing rib 27, and the valve-core shaft assembly SA includes a first valve-core shaft 21 and a second valve-core shaft 22 that are in transmission connection. The first valve-core shaft 21 is in transmission connection with the driving device 50 through the second valve-core shaft 22, and the reinforcing rib 27 is connected between the first partition 23 and the first valve-core shaft 21. Herein, the transmission connection of two components refers to that a transmission force can be transmitted between the two components, and the two components may be directly connected, or may be in transmission connection through a transmission mechanism such as a gear.

Figure 9:
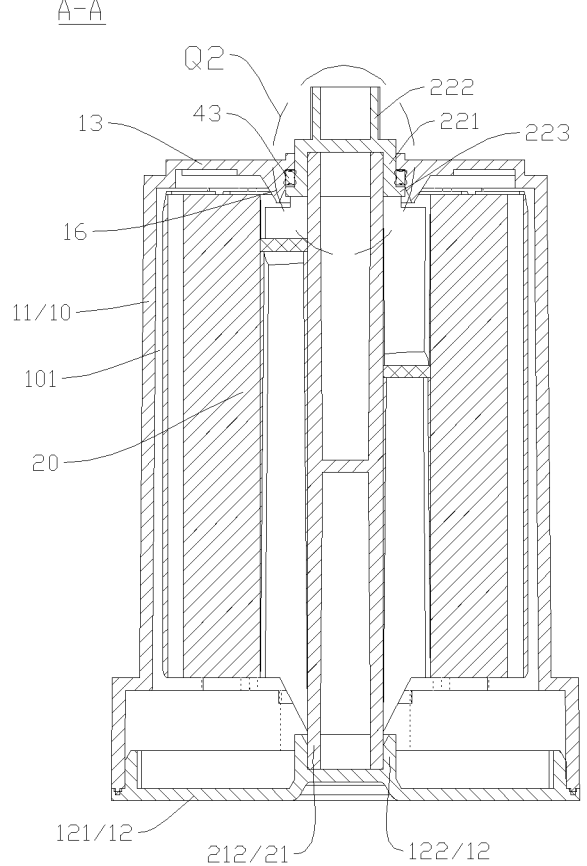
FIG. 9 is a cross-sectional view of the control valve shown in FIG. 8 along direction A-A.

As shown in FIGS. 6 to 10, the valve body 10 further includes a top wall part 13 located at an end of the side wall part 11 in the height direction of the side wall part 11 and a second block 15. The top wall part 13 and the side wall part 11 are integrally formed and form part of a wall of the valve cavity 101. The top wall part 13 has a through hole 131, the through hole 131 communicates with the valve cavity 101. The second block 15 is located in the valve cavity 101 and protrudes from the top wall part 13. At least part of the transmission connection part 222 of the valve-core shaft assembly SA goes through the through hole 131 to be located outside the valve body 10. As shown in FIG. 9, the whole transmission connection part 222 is arranged outside the valve body 10, and the second block 15 is fixedly connected to the top wall part 13 to form an integral structure. For example, the second block 15 may be integrally formed with the top wall part 13. With reference to FIG. 2, when the valve core 20 rotates to a predetermined position, the first block 203 abuts against the second block 15 and restricts the valve core 20 from continuing to rotate towards the second block 15, so that the first block 203 and the second block 15 can form a position reference between the valve core 20 and the valve body 10, thereby making the rotation position of the valve core 20 more accurate, so as to improve the control accuracy of the control valve 1. Moreover, the side wall part 11, the top wall part 13, and the second block 15 can be integrally formed, so that the structural strength of the valve body 10 is improved when the first block 203 abuts against the second block 15. Compared with the embodiment of providing the side wall part 11 and the top wall part 13 separately and fixing the side wall part 11 and the top wall part 13 by welding, the structure of the embodiments of the present application can improve the cracking of a weld seam between the side wall part 11 and the top wall part 13.

As shown in FIGS. 10 to 15, in order to improve the structural strength of the valve core 20, in some embodiments, the valve-core shaft assembly SA includes a first valve-core shaft 21 and a second valve-core shaft 22, and the strength of the second valve-core shaft 22 is greater than the strength of the first valve-core shaft 21. The first valve-core shaft 21 includes a first connection part 211, and the first connection part 211 is located at an end of the first valve-core shaft 21 and at least part of the first connection part 211 is arranged in the valve cavity 101. The second valve-core shaft 22 includes a transmission connection part 222 and a second connection part 221, the transmission connection part 222 of the valve-core shaft assembly SA is provided in the second valve-core shaft 22, and the transmission connection part 222 is located at an end of the second valve-core shaft 22. The second valve-core shaft 22 further includes a second connection part 221, the second connection part 221 and the transmission connection part 222 are arranged along a height direction of the second valve-core shaft 22, at least part of the second connection part 221 is arranged in the valve cavity 101, and at least part of the transmission connection part 222 is arranged outside the valve cavity 101 and protrudes from the top wall part 13. An inner surface of one of the second connection part 221 and the first connection part 211 has teeth, an outer surface of the other of the second connection part 221 and the first connection part 211 has teeth, the teeth of the second connection part 221 meshes with the teeth of the first connection part 211. Through the above arrangement, on the basis of improving the structural strength of the valve core 20, the first valve-core shaft 21 and the second valve-core shaft 22 can rotate synchronously.

In an embodiment, as shown in FIGS. 12 to 15, in order to improve anti-distortion strength of the valve core 20 during rotation, the valve core 20 may include a first spiral reinforcing rib 213, a second spiral reinforcing rib 214, and a third spiral reinforcing rib 224. The first spiral reinforcing rib 213 is located between an outer surface of the first valve-core shaft 21 and an inner surface of the first partition 23, the second spiral reinforcing rib 214 is located in a cavity enclosed by an inner surface of the first valve-core shaft 21, and the third spiral reinforcing rib 224 may be located in a cavity enclosed by an inner surface of the second valve-core shaft 22. In specific implementation, the first spiral reinforcing rib 213, the second spiral reinforcing rib 214, and the third spiral reinforcing rib 224 are spiral extension structures, the first spiral reinforcing rib 213, the second spiral reinforcing rib 214, the first valve-core shaft 21, the first partition 23, and the second partition 24 may be integrally formed by injection molding, and the third spiral reinforcing rib 224 may be integrally formed with the second valve-core shaft 22.

During specific implementation, the inner surface of the second connection part 221 of the second valve-core shaft 22 is of a toothed structure, and the outer surface of the first connection part 211 of the first valve-core shaft 21 is of a toothed structure. The transmission connection between the first valve-core shaft 251 and the second valve-core shaft 22 is realized through the meshing of the toothed structures, so that the first valve-core shaft 251 and the second valve-core shaft 252 can rotate synchronously. In an embodiment, a constituent material of the first valve-core shaft 21 may be a combination of polyamide 66 (PA66) and glass fiber (GF), or a combination of polyphthalamide (PPA) and glass fiber (GF), or polyphenylene sulfide (PPS), a constituent material of the second valve-core shaft 22 may be one or a combination of metal and polyphenylene sulfide (PPS). In other embodiments, the control valve 1 may not be provided with the second valve-core shaft 22, and the first valve-core shaft 21 may be in transmission connection with the driving device, so that the driving device drives the valve core to rotate.

In order to improve the stability of the transmission connection between the first valve-core shaft 21 and the second valve-core shaft 22, in some embodiments, an output torque of the control valve 1 is 3.5 N·m to 4.5 N·m, and an input torque of the valve-core shaft assembly SA is 3.5 N·m to 4.5 N·m. A length of a meshing part of the teeth of the second connection part 221 and the teeth of the first connection part 211 is 10 mm to 15 mm.

Figure 10:
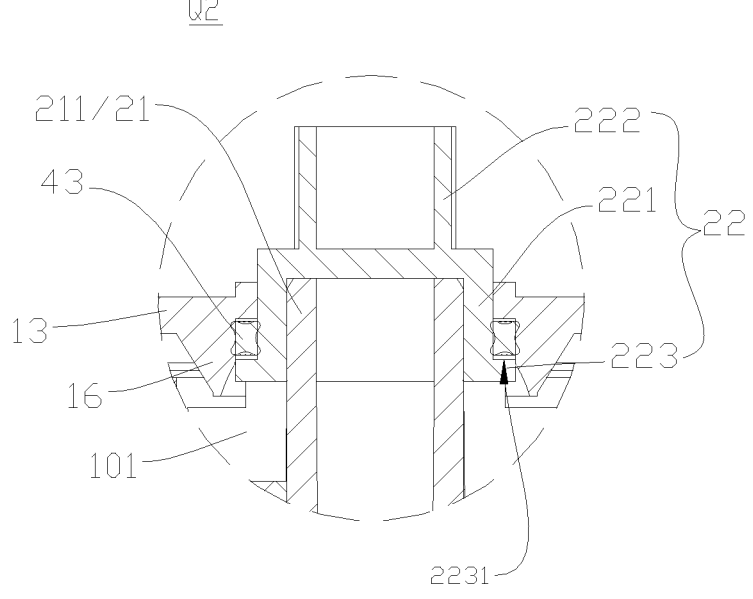
FIG. 10 is a structural schematic diagram of the control valve shown in FIG. 9 at position Q2.
Figure 11:
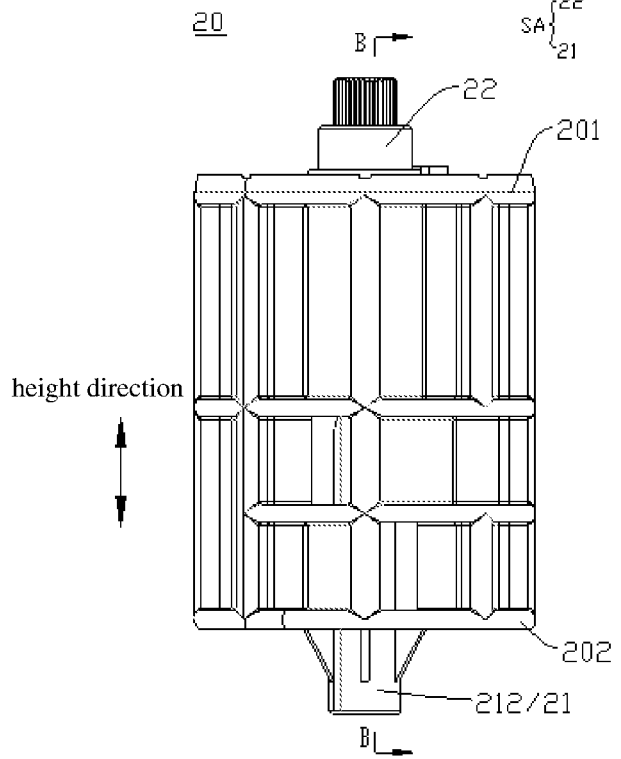
FIG. 11 is a front structural schematic diagram of the valve core shown in FIG. 4.
Figure 12:
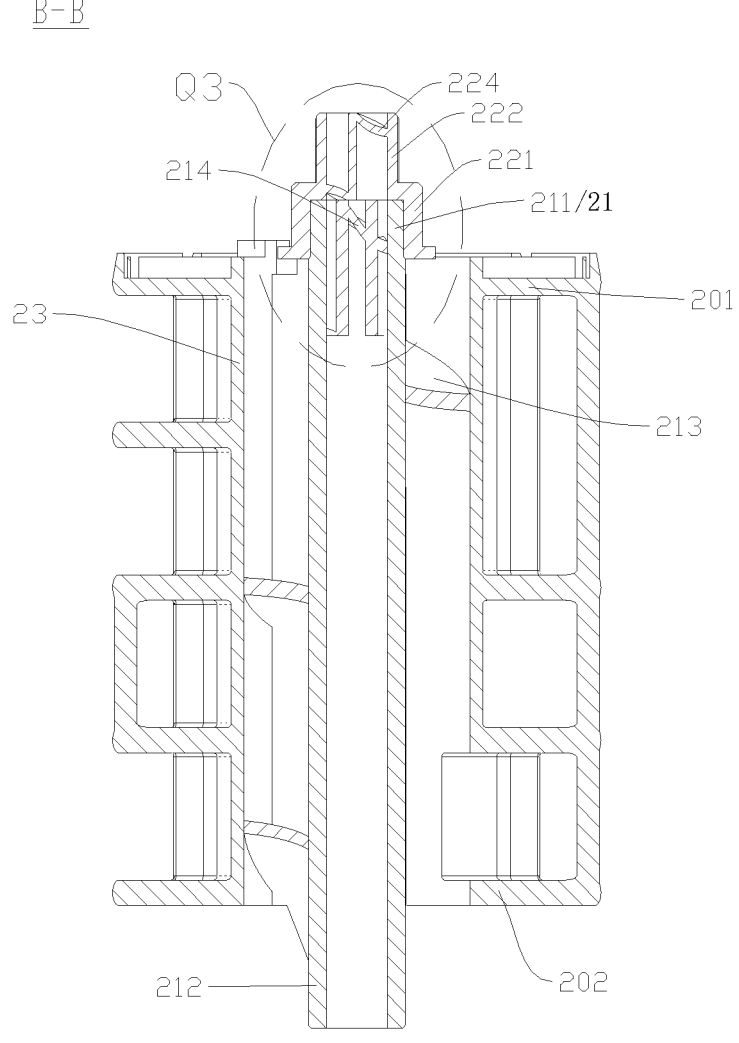
FIG. 12 is a cross-sectional view of the valve core shown in FIG. 11 along direction B-B.
Figure 13:
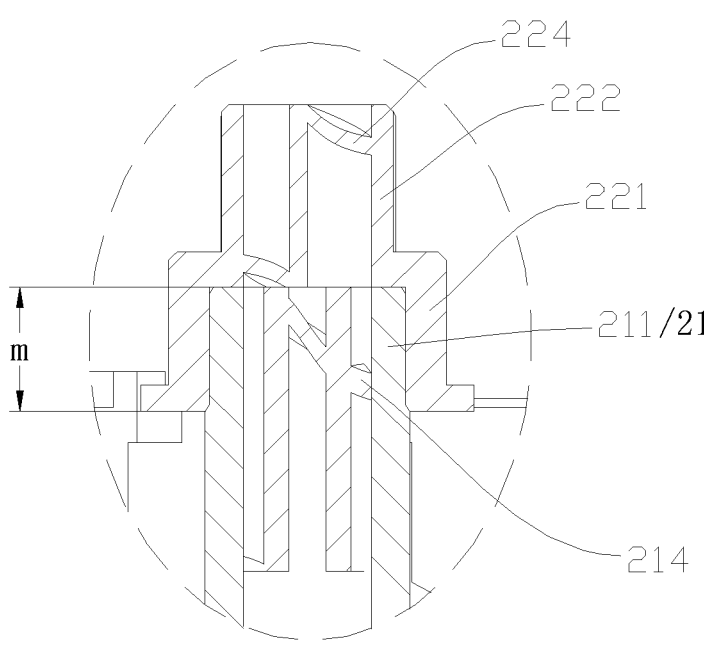
FIG. 13 is a schematic diagram of an enlarged structure of the valve core shown in FIG. 12 at position Q3.
Figure 14:
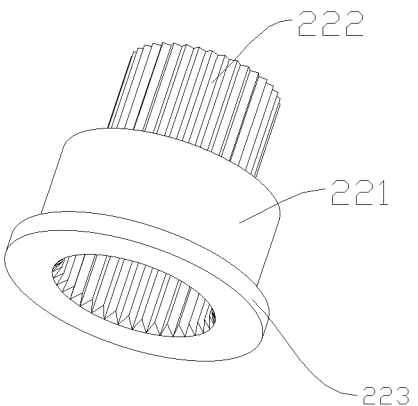
FIG. 14 is a structural schematic diagram of a second valve-core shaft provided according to an embodiment of the present application.
Figure 15:
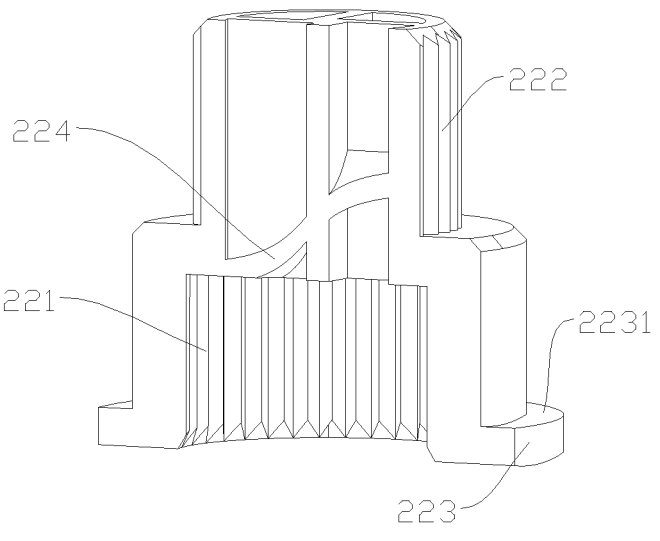
FIG. 15 is a schematic diagram of a cross-sectional structure of the second valve-core shaft shown in FIG. 14.

In some embodiments, a linear expansion coefficient of the second valve-core shaft 22 is less than or equal to a linear expansion coefficient of the first valve-core shaft 21, so that the size change of the second valve-core shaft 22 is relatively small when the second valve core shaft 22 is at ambient temperature, which can make the control valve 1 suitable for environments with various temperatures and improve the applicability of the control valve 1. Further referring to FIGS. 10 to 15, the second valve-core shaft 22 includes a step part 223, the step part 223 is fixedly connected with the second connection part 221 to form an integrated structure, as shown in FIG. 10, or the step part 223 and the second connection part 221 may be separately arranged but fixedly connected. Along the height direction of the second valve-core shaft 22, an orthographic projection of the second connection part 221 is located inside an orthographic projection of the annular step part 223. The step part 223 has a step surface 2231, the step surface 2231 is disposed opposite to the top wall part 13 and there is a gap between the step surface 2231 and the top wall part 13, and the step surface 2231 is located in the valve cavity 101. In a case that the control valve 1 further includes the sealing ring 43, the sealing ring 43 is coaxial with a wall of the through hole 131 of the top wall part 13. The sealing ring 43 is mounted on an outer peripheral side of the second valve-core shaft 22 and is arranged in the gap between the step surface 2231 of the second valve-core shaft 22 and the inner surface of the top wall part 13. By setting the linear expansion coefficient of the second valve-core shaft 22 to be less than or equal to the linear expansion coefficient of the first valve-core shaft 21, the size change of the second valve-core shaft 22 is relatively small when the second valve-core shaft 22 is at the ambient temperature, thereby reducing the deformation of the sealing ring 43 and improving the sealing performance of the control valve 1.

Figure 7:
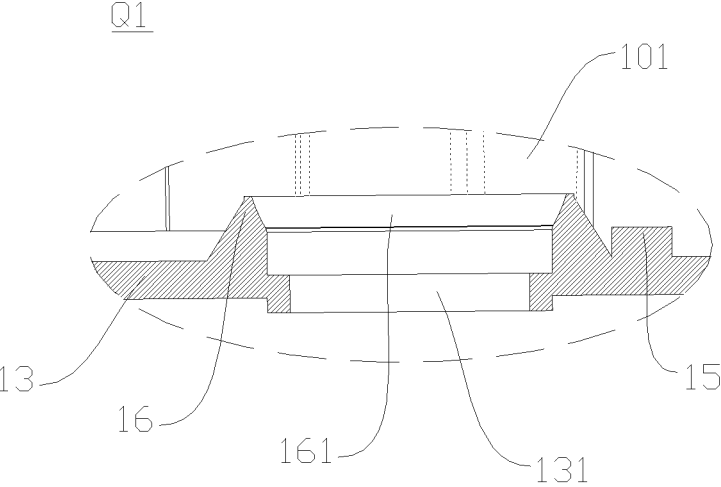
FIG. 7 is a schematic diagram of an enlarged structure of the valve body shown in FIG. 6 at position Q1.
Figure 8:
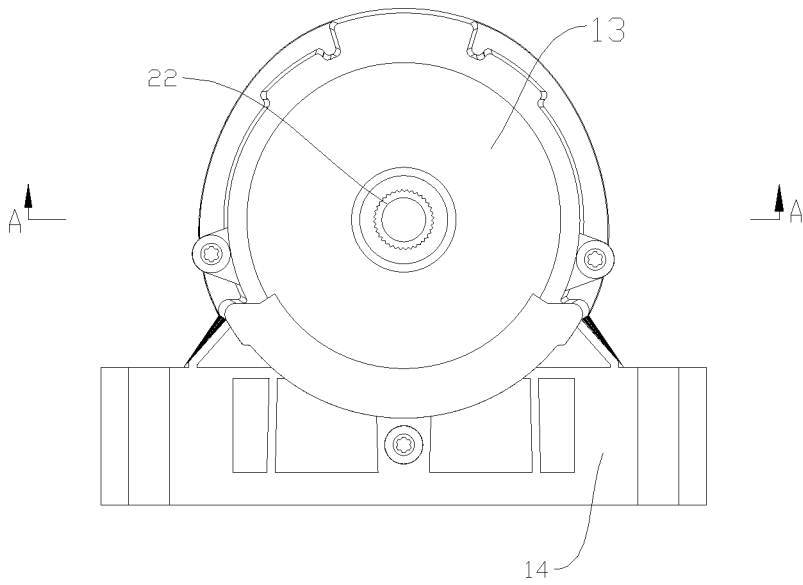
FIG. 8 is a front view of a partial structure of the control valve shown in FIG. 1.

As shown in FIGS. 7 and 10, in some embodiments, the valve body 10 further includes a guide part 16, and the guide part 16 extends from the top wall part 13 to the valve cavity 101. The guide part 16 has a guide channel 161 that penetrates through the guide part 16, and the guide channel 161 is coaxial with the wall of the through hole 131 of the top wall part 13 and communicates with the through hole 131 of the top wall part 13. Along a direction close to the top wall part 13, and a bore diameter of an inner wall surface of the guide channel 161 decreases gradually, and the sealing ring 43 is arranged inside the guide channel 161. The bore diameter of the inner wall surface of the guide channel 161 decreases gradually, so that when the sealing ring 43 is assembled into the valve body 10, the inner wall surface of the guide channel 161 plays a guiding role in the assembly of the sealing ring 43, which facilitates the installation of the sealing ring 43 and improves the accuracy of the installation position of the sealing ring 43.

As shown in FIGS. 1, 2, 4, 8, and 9, in some embodiments, in a case that the control valve 1 further includes the driving device 50, the driving device 50 is located on a side, facing away from the valve cavity 101, of the top wall part 13. The driving device 50 includes a driving member, and the driving member is in transmission connection with the transmission connection part 222. The first block 203 and the second block 15 are both close to the driving device 50, so that when the valve core 20 rotates until the first block 203 abuts against the second block 15, the driving force arm applied to the valve core 50 is relatively small, which reduces the distortion deformation of the valve core 20. The valve body 10 further includes a bottom cover 12, the bottom cover 12 is located on a side, facing away from the top wall part 13, of the side wall part 11, the bottom cover 12 and the side wall part 11 are fixedly arranged and the bottom cover 12 is sealingly connected to the side wall part 11. The bottom cover 12 includes a bottom wall part 121 and a limit part 122, and the limit part 12 protrudes from the bottom wall part 121 and is arranged in the valve cavity 101. The valve-core shaft assembly SA further includes a support part 212, the support part 212 is located at an end, facing away from the top plate 201, of the first valve-core shaft 21, and the support part 212 is located on a side of the bottom plate 202 of the valve core 20. The support part 212 is limitedly connected to the limit part 122. Specifically, in FIG. 9, the limit part 122 is of a groove structure, and the support part 212 is inserted into the groove structure. Through the above arrangement, the installation position of the valve core 20 is accurate, and the rotation stability of the valve core 20 is improved.

In summary, according to the control valve 1 provided by the embodiments of the present application, by providing the first block 203 in the valve core 20 and the second block 15 in the valve body 10, the first block 203 abuts against the second block 15 and restricts the valve core 20 from continuing to move towards the second block 15 when the valve core 20 rotates to the predetermined position, so that the position reference is formed between the valve core 20 and the valve body 10, thereby making the rotation position of the valve core 20 more accurate, so as to improve the control accuracy of the control valve 1. The valve core 20 includes the transmission connection part 222, and the transmission connection part 222 can be in transmission connection with the driving device 50 to drive the valve core 20 to rotate. The first block 203 is fixedly connected to the top plate 201 close to the transmission connection part 222, and the second block 15 is fixedly connected to the top wall part 13 close to the transmission connection part 222, so that when the first block 203 abuts against the second block 15, the first block 203 is relatively close to the transmission connection part 222 and the driving device 50, and the driving force arm applied on the is first block 203 is relatively small, which can reduce the torsional deformation of valve core 20 and improve the operational stability of the control valve 1.

Figure 16:
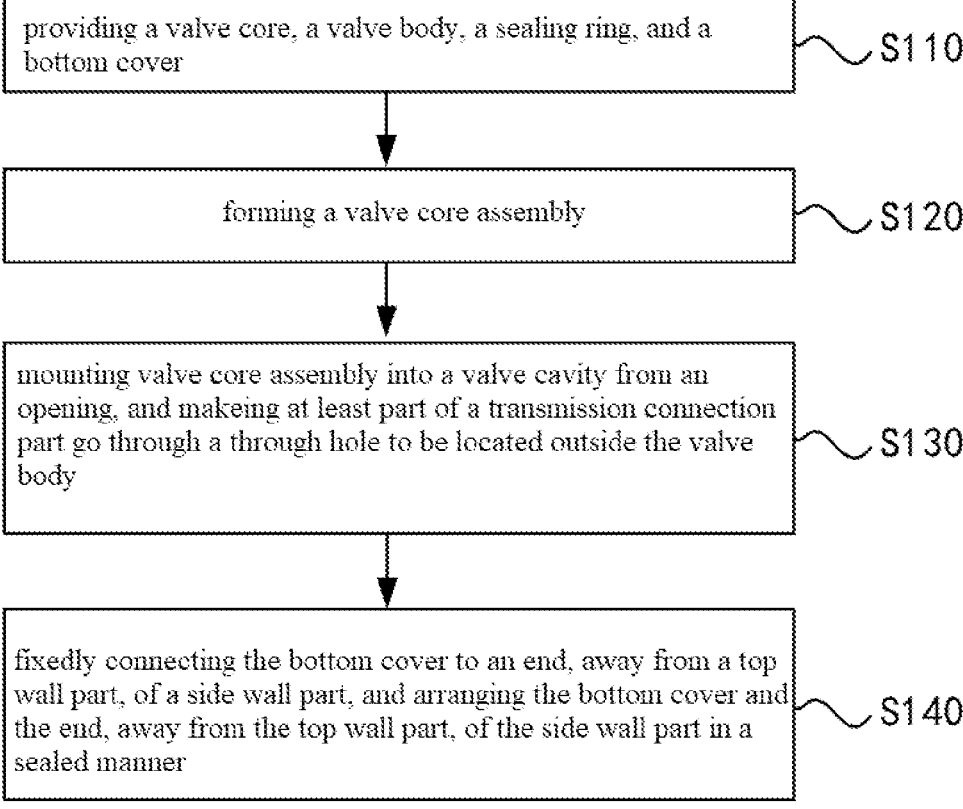
FIG. 16 is a flowchart of a method for manufacturing a control valve provided according to an embodiment of the present application.

As shown in FIG. 16, a method for manufacturing a control valve is further provided according to the embodiments of the present application. Referring to FIGS. 1 to 15, the method for manufacturing a control valve includes the following steps S110 to S160.

In step S110, a valve core 20, a valve body 10, a sealing ring 43, and a bottom cover 12 are provided.

The valve core 20 includes a valve-core shaft assembly SA, and the valve-core shaft assembly SA includes a first valve-core shaft 21 and a second valve-core shaft 22. The first valve-core shaft 21 includes a first connection part 211, and the second valve-core shaft 22 includes a second connection part 221, a step part 223 and a transmission connection part 222. The transmission connection part 222 and the second connection part 221 are arranged along a height direction of the second valve-core shaft 22, and the step part 223 is located on an outer peripheral side of the second connection part 221, and the step part 223 and the second connection part 221 are fixedly connected to form an integrated structure, as shown in FIG. 10, or, the step part 223 and the second connection part 221 may be arranged separately but fixedly connected. The step part 223 has a step surface 2231, and the step surface 2231 may be perpendicular to the height direction of the second valve core axis 22. The valve body 10 includes a side wall part 11 and a top wall part 13, and the control valve 1 has a valve cavity 101. The top wall part 13 and the side wall part 11 are integrally formed and define the valve cavity 101. The top wall part 13 is located at one end of the side wall part 11, and the other end of the side wall part 11 has an opening 111 communicating with the valve cavity 101. The top wall part 13 has a through hole 131 that penetrates through the top wall part 13, and the through hole 131 communicates with the valve cavity 101. The valve core 20 includes a top plate 201, a bottom plate 202, a first block 203, and the valve-core shaft assembly SA. The top plate 201 and the bottom plate 202 are arranged along a height direction of the valve core 20. The valve-core shaft assembly SA includes the transmission connection part 222, and at least part of the transmission connection part 222 is located on a side, facing away from the bottom plate 202, of the top plate 201. The valve body 10 further includes the top wall part 13 and the second block 15, and the top wall part 13 is disposed close to an end of the side wall part 11. The structures of the valve body 10 and the valve core 20 in the embodiments of the present application is the same as the structures of the valve body 10 and valve core 20 provided in any of the above embodiments, which are not repeated here.

In step S120, a valve core assembly is formed.

In the embodiment, step S120 includes assembling the first valve-core shaft 21, the second valve-core shaft 22, and the sealing ring 43 to allow the first connection part 211 to be in transmission connection with the second connection part 221. The sealing ring 43 is mounted on an outer peripheral side of the second valve-core shaft 22 and contacts the step surface 2231 or there is a gap between the sealing ring 43 and the step surface 2231. In an embodiment, an inner diameter of the sealing ring 43 is smaller than an outer diameter of the second valve-core shaft 22, so that the sealing ring 43 is relatively stably limited on the second valve-core shaft 22.

In step S130, the valve core assembly is mounted into the valve cavity 101 from the opening 111, and at least part of the transmission connection part 222 is caused to go through the through hole 131 to be located outside the valve body 10.

Specifically, the valve core 20 is mounted into the valve cavity 101 from the opening 111, and at least part of the transmission connection part 222 is caused to go through the through hole 131 to be located outside the valve body 10, so that when the valve core 20 rotates to a predetermined position, the first block 203 abuts against the second block 15 and restricts the valve core 20 from continuing to rotate towards the second block 15.

In step S140, the bottom cover 12 is fixedly connected to an end, away from the top wall part 13, of the side wall part 11, and the bottom cover 12 and the end, away from the top wall part 13, of the side wall part 11 are arranged in a sealed manner.

In a case that the control valve 1 includes the first sealing member 41 and the second sealing member 42, before step S130 that the valve core assembly is mounted into the valve cavity 101 from the opening 111 and at least part of the transmission connection part 222 goes through the through hole 131 to be located outside the valve body 10, the first sealing member 41 and the second sealing member 42 may be first mounted in the valve cavity 101 to ensure that the control valve 1 has a good sealing performance. The control valve manufactured by the above method for manufacturing a control valve has same beneficial effects as the control valve described above, and the deformation of the sealing ring 43 can be improved, which are not repeated here.

In some embodiments, the bottom cover 12 includes a bottom wall part 121 and a limit part 122, the limit part 122 protrudes from the bottom wall part 121, the first valve-core shaft 21 has a support part 212, the support part 212 is located at one end of the first valve-core shaft 21, and the first connection part 211 is located at the other end of the first valve-core shaft 21. Step S140 that the bottom cover 12 is fixedly connected to an end, away from the top wall part 13, of the side wall part 11, and the bottom cover 12 and the end, away from the top wall part 13, of the side wall part 11 are arranged in a sealed manner includes: limitedly connecting the support part 212 to the limit part 122; and fixedly connecting the bottom cover to the side wall part and arranging the bottom cover and the side wall part in a sealed manner through a welding process. In specific implementation, a whole circle may be welded around the bottom cover 12 and the side wall part 11 through a laser welding process, so that the bottom cover 12 and the side wall part 11 are fixedly connected and arranged in a sealed manner.

In order to make the first valve-core shaft 21 in stable transmission connection with the second valve-core shaft 22 to better transmit a driving torque and prevent the fracture of the first valve-core shaft 21 and/or the second valve-core shaft 22, in some embodiments, an inner surface of one of the second connection part 221 and the first connection part 211 has teeth, and an outer surface of the other of the second connection part 221 and the first connection part 211 has teeth. In this way, step S120 that the valve core assembly is formed includes: forming the second valve-core shaft assembly including mounting the sealing ring 43 on the outer peripheral side of the second valve-core shaft 22 and making the sealing ring 43 contact or spaced apart from the step surface 2231, where an inner diameter of the sealing ring 43 is smaller than an outer diameter of the step surface 2231; meshing the teeth of the second connection part 221 and the teeth of the first connection part 211 and making a length of a meshing part 10 mm to 15 mm.

It should be noted that the above embodiments are only used to illustrate the present application and not to limit the technical solutions described in the present application, For example, definitions for directions such as "front", "back", "left", "right", "up", "down". Although this specification has described the present application in detail with reference to the above embodiments, it should be understood that those skilled in the art can still modify, combine or replace the present application, all technical solutions and improvements thereof that do not deviate from the spirit and the scope of the present application shall fall within the scope of the claims of the present application.

What is claimed is:

1. A control valve comprising a valve body, and a valve core, wherein the valve body comprises a side wall part, the control valve has a valve cavity, and the side wall part forms at least part of a wall of the valve cavity, at least part of the valve core is located in the valve cavity and is configured to be driven to rotate, the valve core comprises a top plate, a bottom plate, a first block, and a valve-core shaft assembly, the top plate and the bottom plate are arranged along a height direction of the valve core, the valve-core shaft assembly comprises a transmission connection part, at least part of the transmission connection part is located on a side, facing away from the bottom plate, of the top plate, the valve core is configured to be driven to rotate through the transmission connection part, and the first block is connected to the top plate; and the valve body further comprises a top wall part and a second block, the top wall part is arranged close to an end of the side wall part, the top wall part has a through hole, which communicates with the valve cavity, at least part of the transmission connection part goes through the through hole to be located outside the valve body, the second block is located in the valve cavity and protrudes from the top wall part, and when the valve core rotates to a predetermined position, the first block abuts against the second block and restricts the valve core from continuing to rotate towards the second block, wherein the valve-core shaft assembly comprises a first valve-core shaft and a second valve-core shaft, a strength of the second valve-core shaft is greater than a strength of the first valve-core shaft, the first valve-core shaft comprises a first connection part, the first connection part is located at an end of the first valve-core shaft and at least part of the first connection part is located in the valve cavity, the second valve-core shaft comprises the transmission connection part, the second valve-core shaft further comprises a second connection part, the second connection part and the transmission connection part are provided along a height direction of the second valve-core shaft and at least part of the second connection part is located in the valve cavity, and at least part of the transmission connection part is located outside the valve cavity and protrudes from the top wall part.

2. The control valve according to claim 1, wherein an inner surface of one of the second connection part and the first connection part has teeth, and an outer surface of the other one of the second connection part and the first connection part has teeth, the teeth of the second connection part meshes with the teeth of the first connection part.

3. The control valve according to claim 2, wherein an input torque of the valve-core shaft assembly is 3.5 N·m to 4.5 N·m; and a length of a meshing part of the teeth of the second connection part and the teeth of the first connection part is 10 mm to 15 mm.

4. The control valve according to claim 1, wherein a constituent material of the first valve-core shaft comprises a combination of polyamide-66 and glass fiber, or a combination of polyphthalamide and glass fiber, or polyphenylene sulfide; and a constituent material of the second valve-core shaft comprises one or a combination of metal and polyphenylene sulfide.

5. The control valve according to claim 1, wherein a linear expansion coefficient of the second valve-core shaft is less than or equal to a linear expansion coefficient of the first valve-core shaft, the second valve-core shaft comprises a step part, the step part has a step surface, and the step surface is located in the valve cavity and is arranged opposite to the top wall part; and the control valve further comprises a sealing ring, the sealing ring is coaxial with a wall of the through hole of the top wall part, the sealing ring is mounted on an outer peripheral side of the second valve-core shaft and is arranged between the step surface of the second valve-core shaft and the top wall part.

6. The control valve according to claim 5, wherein the valve body further comprises a guide part, the guide part extends from the top wall part to the valve cavity, the guide part has a guide channel that penetrates through the guide part, the guide channel is coaxial with the through hole of the top wall part and communicates with the through hole of the top wall part, and the sealing ring is arranged in the guide channel; and along a direction close to the top wall part, a bore diameter of the guide channel decreases gradually.

7. The control valve according to claim 1, wherein the first block extends from the top plate towards a direction away from the bottom plate, the top wall part and the side wall part are integrally formed, the second block is fixedly connected to the top wall part to form an integral structure, and the first block is fixedly connected to the top plate to form an integral structure.

8. The control valve according to claim 1, further comprising a driving device, wherein the driving device is located on a side of the top wall part facing away from the valve cavity, the driving device comprises a driving member, and the driving member is in transmission connection with the transmission connection part;

the valve body further comprises a bottom cover, the bottom cover is located on a side of the side wall part facing away from the top wall part, the bottom cover and the side wall part are fixedly arranged and sealingly connected, the bottom cover comprises a bottom wall part and a limit part, the limit part protrudes from the bottom wall part and is located in the valve cavity, the valve-core shaft assembly further comprises a support part, the support part is located on a side of the bottom plate of the valve core facing away from the top plate, the support part is limitedly connected to the limit part.

9. The control valve according to claim 7, further comprising a driving device, wherein the driving device is located on a side of the top wall part facing away from the valve cavity, the driving device comprises a driving member, and the driving member is in transmission connection with the transmission connection part;

the valve body further comprises a bottom cover, the bottom cover is located on a side of the side wall part facing away from the top wall part, the bottom cover and the side wall part are fixedly arranged and sealingly connected, the bottom cover comprises a bottom wall part and a limit part, the limit part protrudes from the bottom wall part and is located in the valve cavity, the valve-core shaft assembly further comprises a support part, the support part is located on a side of the bottom plate of the valve core facing away from the top plate, the support part is limitedly connected to the limit part.

10. The control valve according to claim 2, further comprising a driving device, wherein the driving device is located on a side of the top wall part facing away from the valve cavity, the driving device comprises a driving member, and the driving member is in transmission connection with the transmission connection part;

the valve body further comprises a bottom cover, the bottom cover is located on a side of the side wall part facing away from the top wall part, the bottom cover and the side wall part are fixedly arranged and sealingly connected, the bottom cover comprises a bottom wall part and a limit part, the limit part protrudes from the bottom wall part and is located in the valve cavity, the valve-core shaft assembly further comprises a support part, the support part is located on a side of the bottom plate of the valve core facing away from the top plate, the support part is limitedly connected to the limit part.

11. The control valve according to claim 3, further comprising a driving device, wherein the driving device is located on a side of the top wall part facing away from the valve cavity, the driving device comprises a driving member, and the driving member is in transmission connection with the transmission connection part;

the valve body further comprises a bottom cover, the bottom cover is located on a side of the side wall part facing away from the top wall part, the bottom cover and the side wall part are fixedly arranged and sealingly connected, the bottom cover comprises a bottom wall part and a limit part, the limit part protrudes from the bottom wall part and is located in the valve cavity, the valve-core shaft assembly further comprises a support part, the support part is located on a side of the bottom plate of the valve core facing away from the top plate, the support part is limitedly connected to the limit part.

12. The control valve according to claim 4, further comprising a driving device, wherein the driving device is located on a side of the top wall part facing away from the valve cavity, the driving device comprises a driving member, and the driving member is in transmission connection with the transmission connection part;

the valve body further comprises a bottom cover, the bottom cover is located on a side of the side wall part facing away from the top wall part, the bottom cover and the side wall part are fixedly arranged and sealingly connected, the bottom cover comprises a bottom wall part and a limit part, the limit part protrudes from the bottom wall part and is located in the valve cavity, the valve-core shaft assembly further comprises a support part, the support part is located on a side of the bottom plate of the valve core facing away from the top plate, the support part is limitedly connected to the limit part.

13. The control valve according to claim 5, further comprising a driving device, wherein the driving device is located on a side of the top wall part facing away from the valve cavity, the driving device comprises a driving member, and the driving member is in transmission connection with the transmission connection part;

the valve body further comprises a bottom cover, the bottom cover is located on a side of the side wall part facing away from the top wall part, the bottom cover and the side wall part are fixedly arranged and sealingly connected, the bottom cover comprises a bottom wall part and a limit part, the limit part protrudes from the bottom wall part and is located in the valve cavity, the valve-core shaft assembly further comprises a support part, the support part is located on a side of the bottom plate of the valve core facing away from the top plate, the support part is limitedly connected to the limit part.

14. The control valve according to claim 6, further comprising a driving device, wherein the driving device is located on a side of the top wall part facing away from the valve cavity, the driving device comprises a driving member, and the driving member is in transmission connection with the transmission connection part;

the valve body further comprises a bottom cover, the bottom cover is located on a side of the side wall part facing away from the top wall part, the bottom cover and the side wall part are fixedly arranged and sealingly connected, the bottom cover comprises a bottom wall part and a limit part, the limit part protrudes from the bottom wall part and is located in the valve cavity, the valve-core shaft assembly further comprises a support part, the support part is located on a side of the bottom plate of the valve core facing away from the top plate, the support part is limitedly connected to the limit part.

15. A method for manufacturing a control valve, comprising:

providing a valve core, a valve body, and a bottom cover, wherein the valve body comprises a side wall part, the control valve has a valve cavity, the side wall part forms at least part of the wall of the valve cavity, the valve core comprises a top plate, a bottom plate, a first block, and a valve-core shaft assembly, the top plate and the bottom plate are arranged along a height direction of the valve core, the valve-core shaft assembly comprises a transmission connection part, at least part of the transmission connection part is located on a side, facing away from the bottom plate, of the top plate, the valve body further comprises a top wall part and a second block, the top wall part is arranged close to one end of the side wall part, the top wall part has a through hole, which communicates with the valve cavity, and the other end of the side wall part has an opening communicating with the valve cavity;

mounting the valve core into the valve cavity from the opening, and making at least part of the transmission connection part go through the through hole to be located outside the valve body, so as to allow the first block to abut against the second block and restrict the valve core from continuing to rotate towards the second block, when the valve core rotates to a predetermined position; and fixedly connecting the bottom cover to an end, away from the top wall part, of the side wall part, and arranging the bottom cover and the end, away from the top wall part, of the side wall part in a sealed manner, wherein the valve-core shaft assembly comprises a first valve-core shaft and a second valve-core shaft, the first valve-core shaft comprises a first connection part, the second valve-core shaft comprises a second connection part, a step part, and a transmission connection part, and the transmission connection part and the second connection part are arranged along a height direction of the second valve-core shaft, the step part is located on an outer peripheral side of the second connection part, and the step part has a step surface;

after providing the valve core, the valve body, and the bottom cover, the method further comprises:

assembling the first valve-core shaft, the second valve-core shaft, and a sealing ring to allow the first connection part to be in transmission connection the second connection part drive, wherein the sealing ring is mounted on an outer peripheral side of the second valve-core shaft and contacts the step surface or there is a gap between the sealing ring and the step surface.

16. The method for manufacturing a control valve according to claim 15, wherein the bottom cover comprises a bottom wall part and a limit part, the limit part protrudes from the bottom wall part, and the first valve-core shaft has a support part, fixedly connecting the bottom cover to the end of the side wall part away from the top wall part, and arranging the bottom cover and the end of the side wall part away from the top wall part in a sealed manner comprises:

limitedly connecting the support part to the limit part; and fixedly connecting the bottom cover to the end of the side wall part and arranging the bottom cover and the end of the side wall part in a sealed manner through a welding process.

17. The method for manufacturing a control valve according to claim 15, wherein an inner surface of one of the second connection part and the first connection part has teeth, and an outer surface of the other of the second connection part and the first connection part has teeth, assembling the first valve-core shaft, the second valve-core shaft, and the sealing ring comprises:

forming a second valve-core shaft assembly, comprising mounting the sealing ring on the outer peripheral side of the second valve-core shaft and making the sealing ring contact or spaced apart from the step surface, wherein an inner diameter of the sealing ring is smaller than an outer diameter of the step surface; and meshing the teeth of the second connection part and the teeth of the first connection part and making a length of a meshing part 10 mm to 15 mm.

* * * * *